A. DEVILLE.
MOLDING MACHINE.
APPLICATION FILED AUG. 28, 1905.

989,578.

Patented Apr. 18, 1911.
10 SHEETS—SHEET 2.

A. DEVILLE.
MOLDING MACHINE.
APPLICATION FILED AUG. 28, 1905.

989,578.

Patented Apr. 18, 1911.
10 SHEETS—SHEET 7.

UNITED STATES PATENT OFFICE.

ALBERT DEVILLE, OF CHARLEVILLE, FRANCE.

MOLDING-MACHINE.

989,578.   Specification of Letters Patent.   Patented Apr. 18, 1911.

Application filed August 28, 1905. Serial No. 276,127.

*To all whom it may concern:*

Be it known that I, ALBERT DEVILLE, a citizen of the Republic of France, residing at Charleville, Ardennes, in France, have invented certain new and useful Improvements in or Relating to Molding-Machines, of which the following is a specification.

In the present state of foundry practice, the apparatus required for the present method of molding such a part as a large boiler, consists, besides the pattern, of a lower box, of an upper box, of a part of less height on which is placed the core, and of an upper part or top in which is arranged the runner. The mold is turned over twice. In such molding operation there is a great amount of manual work which must be executed by skilled workmen.

The machine forming the subject of this invention comprises one or more mold-frames or casings, each combined with upper and lower pressure parts, and means for producing pressure in the interior, capable of coöperating with the said frame for inclosing and compressing in it, in and around the pattern, a quantity of sand intended for producing a mold, the compression of sand being effected by means of a compressed fluid. This process and the machinery employed are hereinafter described and illustrated, in the accompanying drawings, in which:—

Fig. 7ᵃ is a sectional detail view showing the lower portion of the piston rod seen in Fig. 7, and also showing the piston on said rod and the cylinder within which said piston operates.

Before explaining the apparatus in detail, it is advisable, in order to make the construction and the working of the machine clearer, first to describe the whole of it as well as its working for a complete cycle of operations (Figs. 1 to 5).

Figure 1:
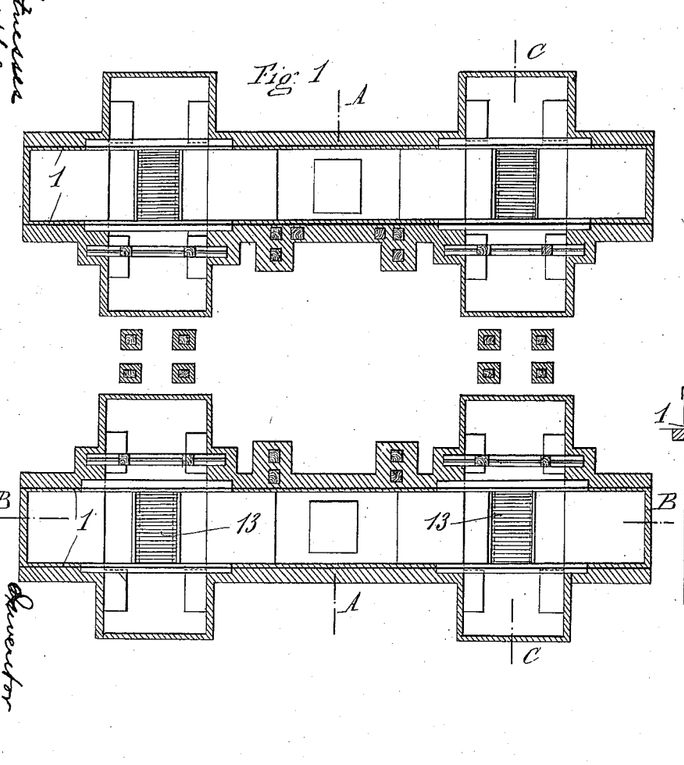
Figure 1 shows a general plan of the installation, the foundation being shown in section.
Figure 2:
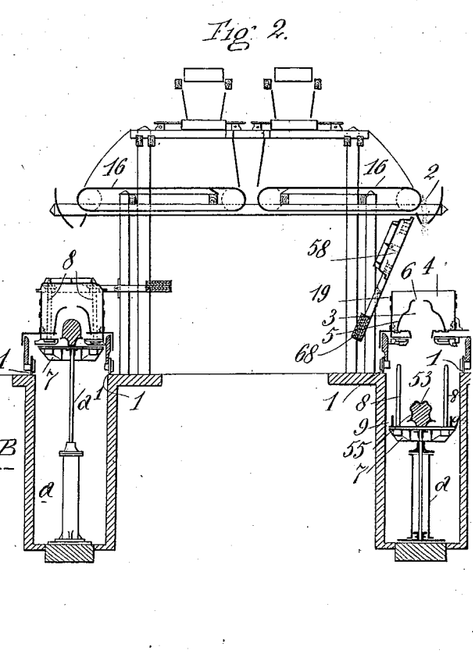
Fig. 2 is a vertical section on the line A—A of Fig. 1.

The machine in which the molding proper is effected, is called hereinafter the "frame-mold", and is mounted on a movable carriage. The number of these carriages with frame-molds is four in the construction illustrated, these carriages with their frame-molds being arranged in twos on two parallel rolling tracks (Figs. 1 and 2). Let one of these tracks be now considered. The track, consisting of two rails 1, 1, Figs. 1 and 2, is arranged at the edge of a longitudinal pit of a fairly great depth in the center, and less deep at the ends, where it only serves to receive the end of the elevating chains. In the center is vertically arranged a cylinder $a$ having a piston rod $a'$ supporting the lower pressure head 7 which carries at the center and around its upper edge flexible cloths or bags 55, 9, forming the inflating apparatus hereinafter more fully described. This piston is driven by a compressed fluid, the same as is used for molding. It serves for two molds on the same track. The lower pressure head 7 comprises a strong plate 48 with strengthening ribs, a ring or plate 49 above it carrying a ring of inflaters 9, and a central bracket or support 54 and projection or core 53 provided within an inflatable bag or casing 55. The tubular inflating devices 9 thus form a crown outside the pattern and will be immersed in the sand forming the outer wall of the mold. Between the plates 48, 49 is formed an annular passage 50′ communicating with the inflaters on the one hand and on the other hand with the main compressed air pipe having a pressure of eight atmospheres, by means of a long flexible tube 51 to enable the platform to rise and descend freely. Above the passage 50′ and on the ring 49 at regular intervals are mounted pipes 52, which pass through the holes $c^2$ in the cup. These pipes are surmounted by the inflating devices 9 previously referred to. The central inflater can be simultaneously expanded through a connection 56. The core 53 is provided with various passages to allow the compressed air which is supplied to the hollow part of the support 54 through the tube 56, to enter the sleeve 55. Annular grooves 50 are provided around the passage 50' for packing material to form a tight joint. Upon the plate 48 are mounted a large number of rods $b$ provided to support the bottom of the cup 18 which has to sustain enormous pressures during the compression operation. All these parts, 48, $b$, 49, 52, 9, 54, 53, move up and down together with the piston rod $a'$. The frame mold comprises a lateral casing 19 and a cup or base 18 having a central opening $c'$ and circumferential openings $c^2$ for the passage of the inflating devices.

Figure 3:
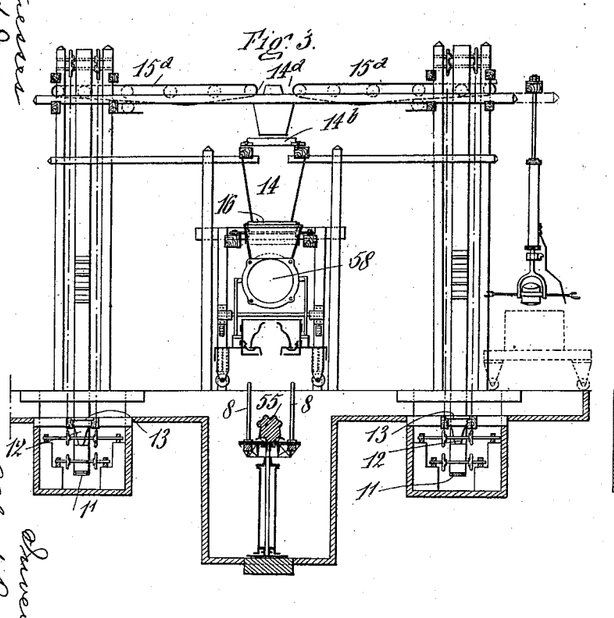
Fig. 3 is a vertical section on the line B—B of Fig. 1, showing among other parts the mold frame mounted on a carriage, the pressure head, as well as the endless bands, and elevating chains to return the sand to the feeding place.
Figure 4:
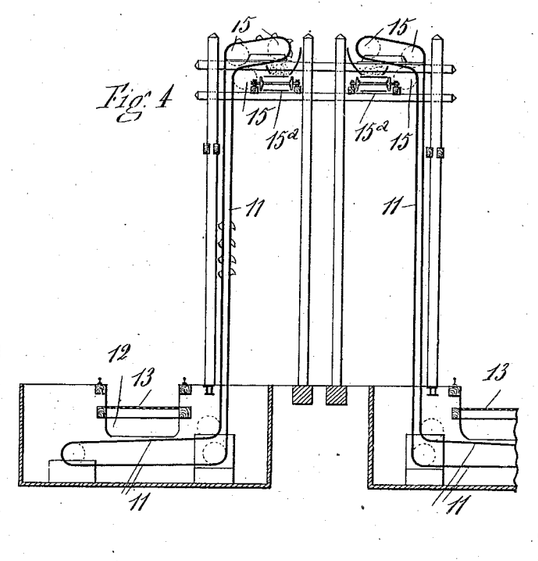
Fig. 4 a vertical section on the line C—C of Fig. 1 showing the elevating chains as well as the parts forming the screens.
Figure 5:
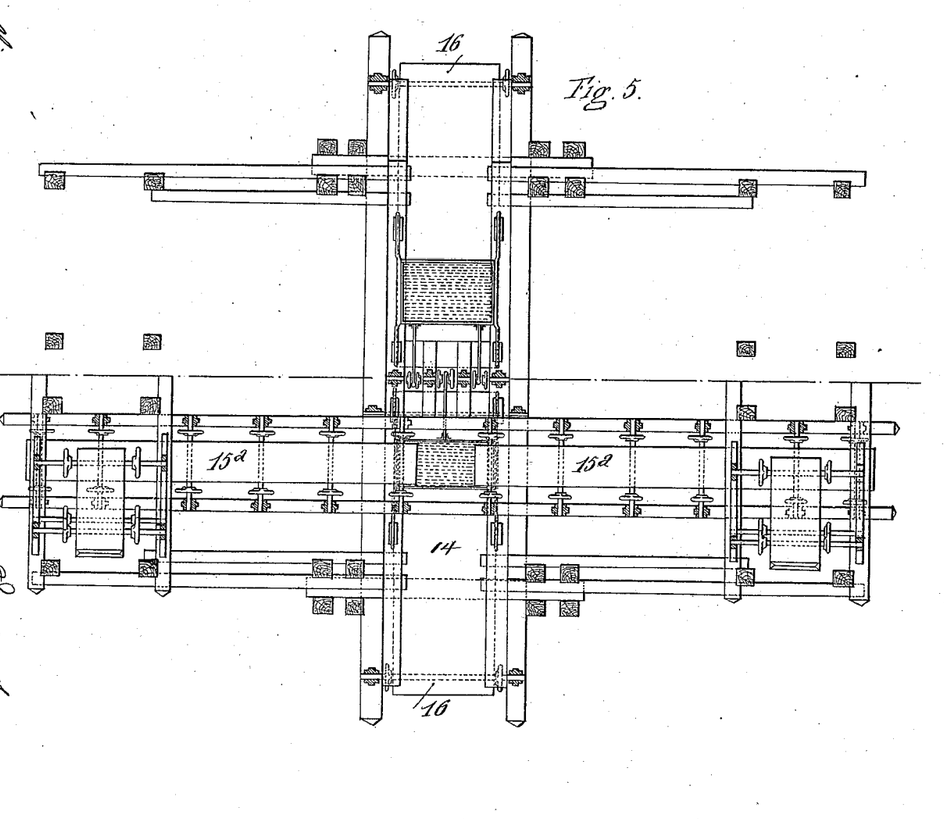
Fig. 5 is a plan and shows the upper bands for returning the sand and the wire-work forming the screen.

One of the carriages having been provided with a frame-mold is brought above the piston which, on rising, introduces the inflaters 9, 55, into the interior of the casing 19, the bottom opening $c'$ of which is thereby closed. When these inflaters enter the interior of the mold frame, the pockets are empty or collapsed. Immediately above the raising cylinder piston is a mechanically-operated inlet 2 for sand (Fig. 2). The sand falls from the top, fills the interior 3 of the pattern 5, as well as the space 4 between the pattern and the lateral wall of the mold frame 19. When it reaches the level of the top of the pattern 5, a cover $55^x$ is placed upon it at 6, and the filling continued. When the sand is flush with the top of the frame or slightly higher, the supply is stopped, and the upper pressure head 58 (Fig. 2, right hand side) provided with flexible cloth or packing 61 (Fig. 7) which makes a tight joint with the upper edge of the casing 19 is swung down (Fig. 2, left hand side). This upper head is then secured to the lower head 7 carried by the raising piston by means of four columns 8 passing through holes $8^a$ (Figs. 6, 10 and 11) in the upper pressure head or cover 58, and secured at the top by keys $8^b$ or the like (Fig. 7). Then compressed fluid is admitted to the upper head or cover 58, and to the inflating parts of the lower head, i. e., to the inflaters 9 and 55 (Fig. 7) in order to effect the necessary pressing and ramming of the sand against the pattern. By regulating this pressure or its duration by a simple manipulation of the compressed fluid admission valve, molds with walls of greater or less thickness may be easily and equally well molded with the same pattern. The next operation is the withdrawal of the pattern. The upper head 58 is raised after the columns 8 have been released, and the lower head 7 is lowered (Figs. 2 and 7). The mold proper is provided with a series of vertical screws mechanically-operated and more fully described hereinafter. By means of these screws the whole bottom portion carrying the inner portion of the sand mold can be lowered, the pattern remaining suspended to the upper portion. Then a light frame or truck is passed under the pattern 5 which is then entirely disconnected from the molded sand surrounding it in the casing 19 (Fig. 2) whereupon the latter is raised, and the pattern remaining on the truck, is then pulled out from under the frame 19. The two parts of the mold having been separated, the small necessary corrections are made. The lower part of the sand mold is then raised, and the upper part simultaneously lowered, these parts coming together and forming between them the mold ready for casting, or to receive the molten metal. To withdraw the casting, the mold-frame carriage is brought over that part of the pit in which travels an endless band elevator 11 (Figs. 3 and 4), the bottom portion of the sand mold is lowered, a frame is passed, in the same way as for the pattern, under the casting which remains in the upper part of the mold and then the frame 19 is raised. The casting is then left on the frame, and is withdrawn on a truck as in the case of the pattern, but the truck in question is conveyed away to a cooling chamber after having allowed as much of the sand as possible to drop. At the same time the greatest portion of the sand from the molding frame 19 is caused to fall into a hopper 12, after passing through a coarse grating 13. Fig. 4) on which the lumps of sand are broken up and screened. Thence it is carried by the bucket elevator 11, guided at the top by rollers 15, to a transversely-arranged band $15^a$ from which it is discharged at $14^a$ (Fig. 3). As the sand is discharged in a steady stream, it is sprayed by any suitable means with a mixture of water and air under pressure. The effect of this operation is to cool the sand and to restore to its particles the water which is required, together with the clay, to give it the necessary cohesion. The sand thus moistened and restored is received on a reciprocating screen $14^b$. The screened and cooled sand is then collected in a large case or hopper 14 (Fig. 3) closed at the bottom by large endless bands 16 (Fig. 2) driven by drums rotating and stopping by means of clutches operated by the attendant. The band returns the sand to the discharge or feeding point 2 of the mold frame (Fig. 2). Such is the complete cycle of an operation, the part is cast and removed, the mold frame returned to its original position, and the sand, less the burned and unutilizable waste, is restored, cooled, and carried above the mold-frame for re-use.

The whole of this system of bands, and sand treatment apparatus, is mounted and held on a wooden frame-work, clearly shown in the drawing; it will be readily understood that an iron framework of any shape could be used instead.

The combination or combined use of the means hereinbefore described, lead to the excellent result obtained by this process, and for the best work it is inadvisable to remove or omit any of the above elements as the object in view would not be best attained if any of the above means were suppressed.

After having described the whole of the machine and its working, constructional details of the machine will be described but it must be pointed out that various parts being in duplicate it will be sufficient in each case to describe only one of the identical parts.

Figure 10:
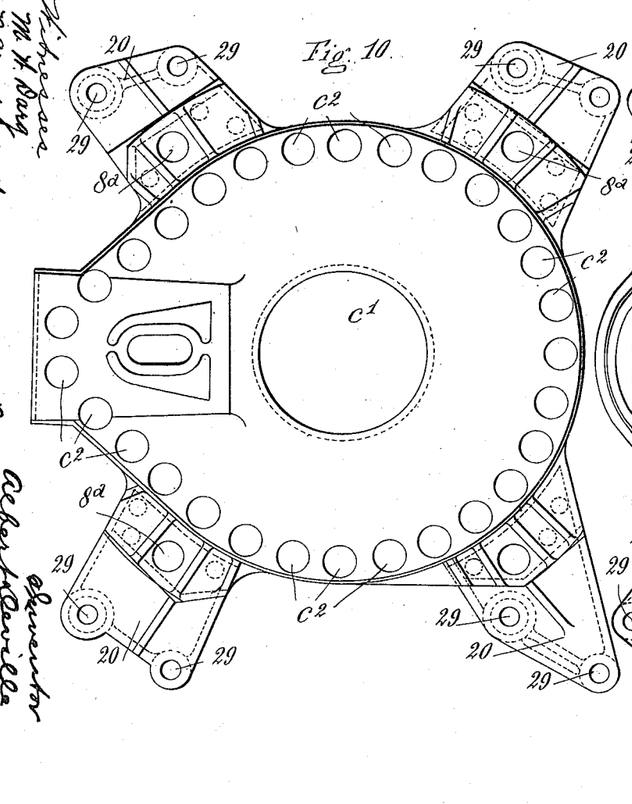
Fig. 10 is a plan of the cup or lower portion of the mold and its arms.
Figure 11:
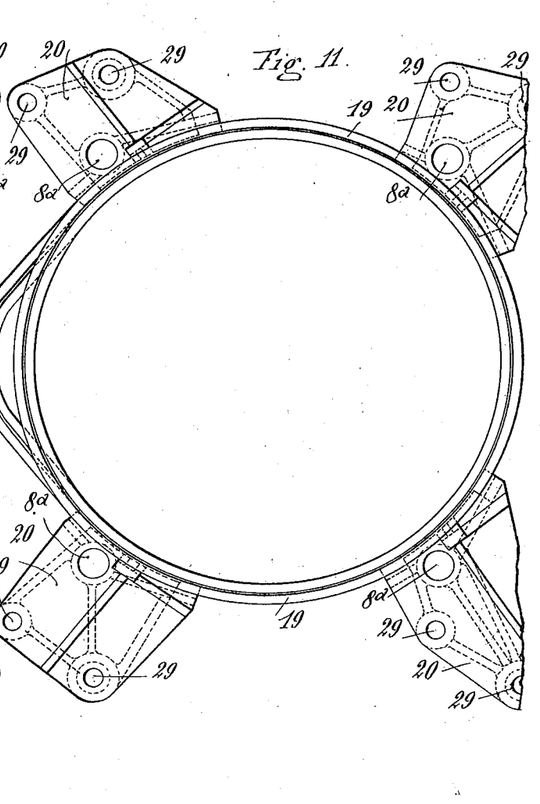
Fig. 11 is a plan of the frame or casing 19.
Figure 12:
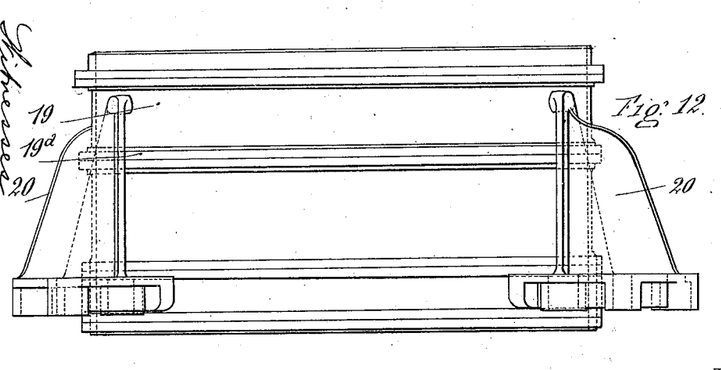
Fig. 12 is an elevation of the same.
Figure 13:
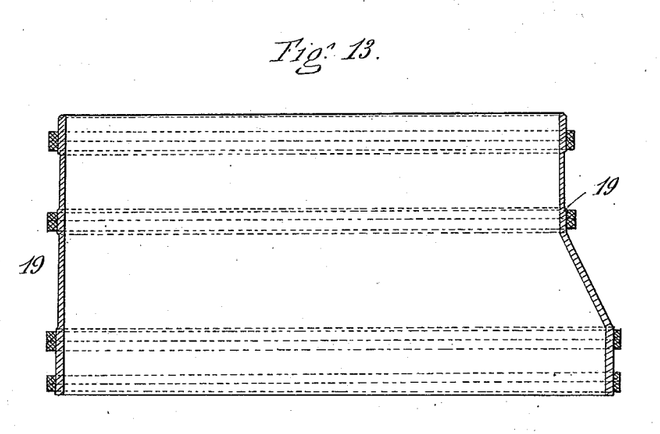
Fig. 13 is a vertical section of the same.
Figure 14:
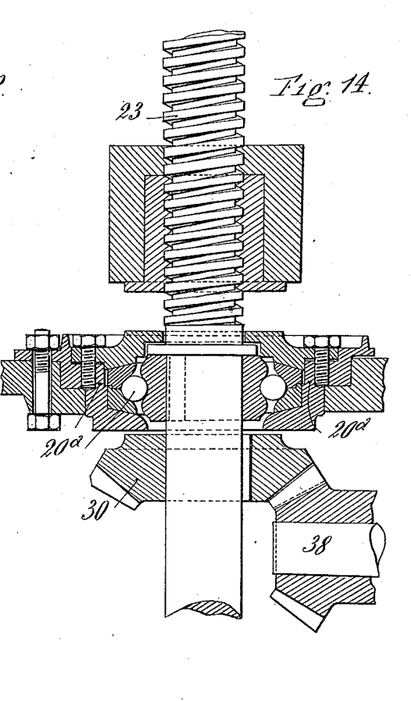
Fig. 14 shows the mounting of one of the raising and lowering screws.

The mold or molding machine proper (Figs. 6 to 13) consists of a platform 17 (Figs. 6, 7 and 8) very strong and mounted on four rollers (Fig. 7). The center of this platform has an opening intended for the passage of a kind of cup 18 (Fig. 7) which affords support to the inner sand mold and is of shape suitable for the pattern. Above this cup is the cover or frame proper 19 made preferably of cast iron surrounded by hoops 19$^a$ (Figs. 7 and 12) so as to withstand an internal pressure of several atmospheres. The cup 18 and the frame 19 are each provided with four strongly secured arms 20 (Figs. 10 to 12). Through these arms pass two sets of vertical rods 21 to 28 (Figs. 6 and 8), passing through corresponding perforations 29 (Figs. 10 and 11) in the cup and frame respectively. These rods receive, as will be seen later on, whenever desired, a rotary movement in one or in the other direction, and are mounted on adjustable ball bearings 20$^a$ (Fig. 14). The two sets of rods are screw-threaded at one end, and smooth at the other. The screw-threaded end, on passing through its supporting arm, engages a brass nut secured to the said arm. Four of these rods are screw-threaded above the platform and control the movement of the upper box or frame, and the others are screw-threaded below the platform for guiding the cup or lower frame. The non-screw-threaded ends are plain and pass through holes 29 (Figs. 10 and 11) in which they fit exactly, so that the two parts of the mold, i. e., the cup 18 and frame 19, are guided in a perfect manner, since the plain portions of the rods form guide-pins for them.

Figure 6:
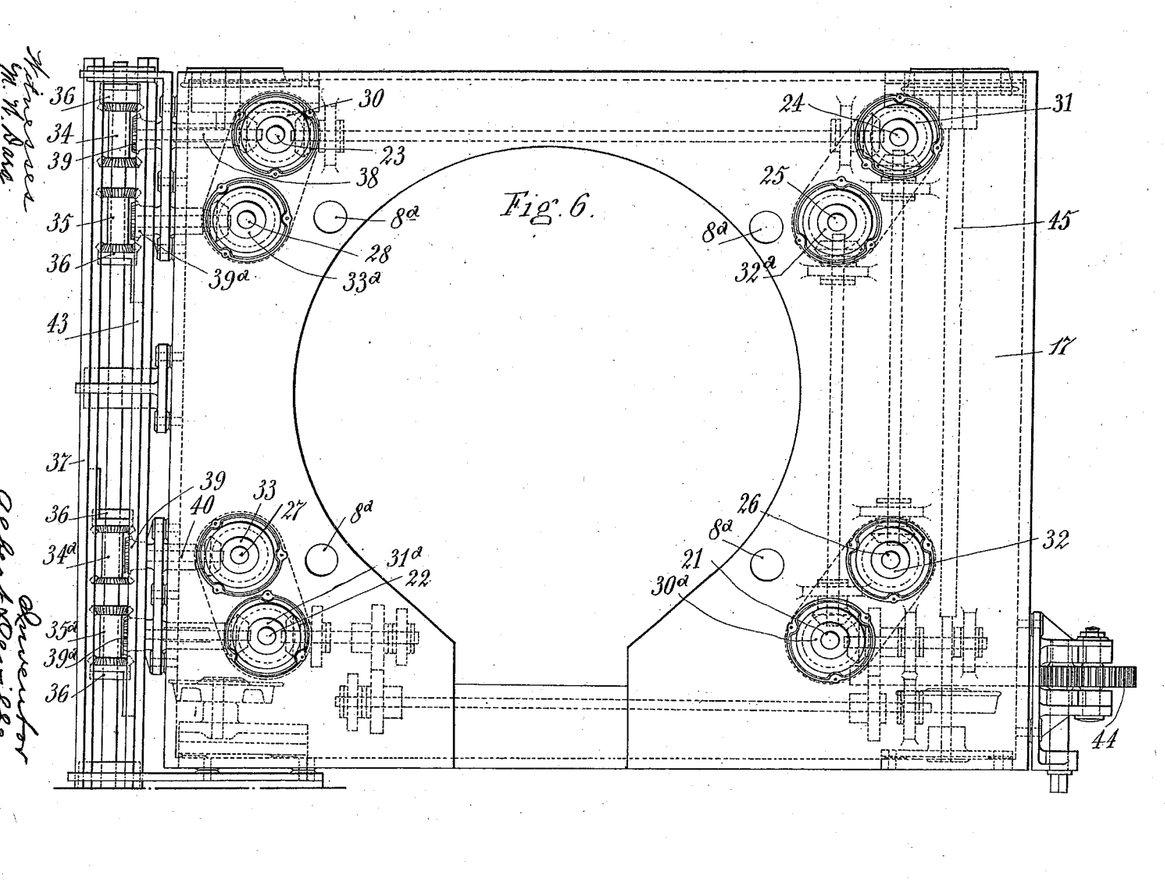
Fig. 6 is a plan of the carriage of the mold frame with an operating gear, which is mounted upon it.
Figures 7, 7A:
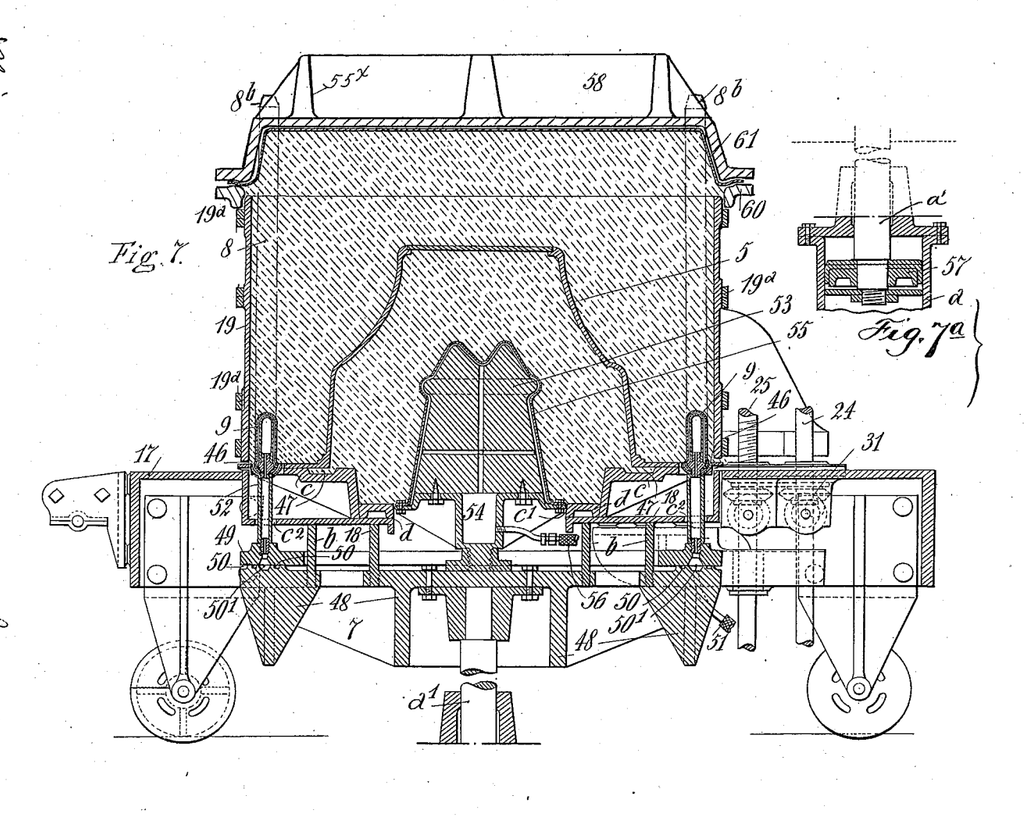
Fig. 7 is a longitudinal section of the mold frame and carriage.

On each of the screw-rods is keyed one of a set of pinions 30, 30$^a$, 31, 31$^a$, 32, 32$^a$, 33 or 33$^a$ (Fig. 6). The four rods screw-threaded above the table, that is to say, those which cause the frame or box 19 to rise or to descend, are marked 23, 24, 26, 27, in Fig. 6, and those for lowering the cup 21, 22, 25, 28.

The rod 23 is driven by the pinion 30 and a spindle 38, provided at its other end with a pinion 39. It is connected to the rod 24 on the other side by a shaft and intermediate pinions transmitting the movement of the rod 23 to the pinion 31 keyed on the rod 24. In a similar manner, the movement is continued to the pinion 32 and rod 26, and for operating the rod 27 a spindle 40 is arranged similarly to the spindle 38 (Fig. 6).

Figure 8:
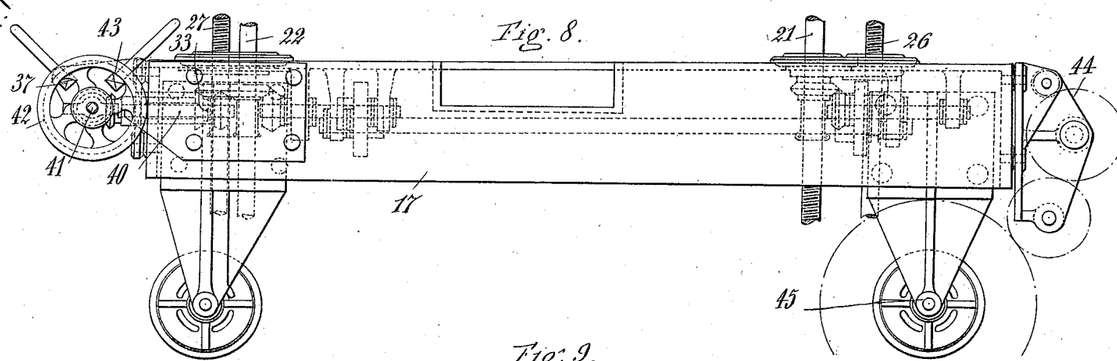
Fig. 8 is a side elevation, and Fig. 9 an end view of the carriage.
Figure 9:
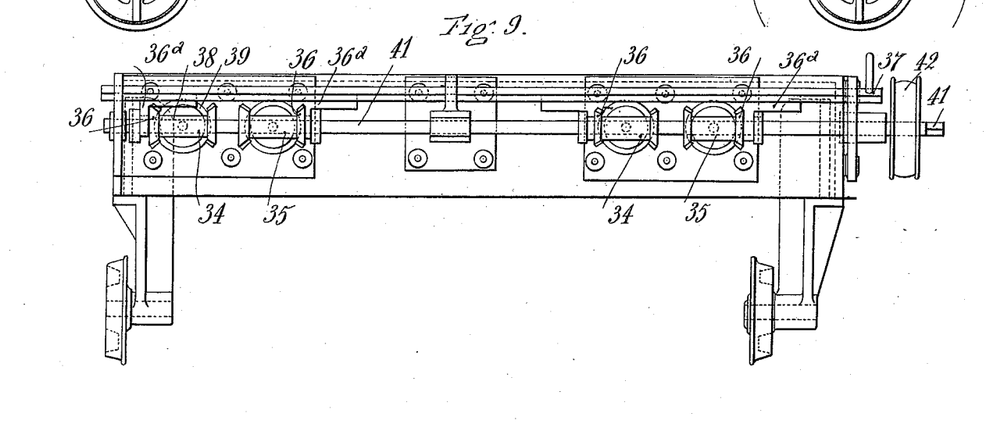

On the spindle 41, transverse to the shafts 38 and 40 is fixed a pulley 42. This spindle is supported by bracket bearings at its ends, and in the center, and carries four gears 34, 35, 34$^a$, 35$^a$, capable of sliding longitudinally on the shaft the gears 34, 35, being constituted by a socket terminating in two oppositely arranged bevel pinions. When, say, one end of the gears 24, 24$^a$ engage with the pinions 39 of the shafts 38 and 40, the rotary movement thus communicated to the screw-threaded rods 23, 24, 26, 27, causes the frame 19 to rise. When on the contrary the other pinions of the gear are caused to engage with the pinion 39, the rods will rotate in the opposite direction and the frame 19 will be lowered. These traveling gears are moved by means of forks 36$^a$ (Fig. 9) engaging collars 36 on the gears, two being secured to the operating rod 37, and two to the operating rod 43, (Fig. 8). These operating rods are provided with three notches, one for the position of rest, another for engaging on the right-hand side, and the third for engaging on the left-hand side. The same system is applied to the operation of the four lowering screws 21, 22, 25, and 28, for moving the cup 18 carrying the core. It will therefore be readily understood that with the pulley moving, it is possible, by manipulating the rods 37, 43, to raise or to lower the frame or upper box 19 and the cup 18 supporting the core, either separately or together. As regards the pulley 42, it is not driven by its belt during the filling operation, but when it is desired to operate the shaft 41, a loose belt is arranged connected to the driving shaft, so as to remain still, as long as it is not stretched, and in order to stretch it, during the time that it has to drive, it is sufficient, after having placed it on the rim of the pulley 42, to move the entire mold carriage slightly in the desired direction, while it can be slackened by a reverse movement of the carriage.

In order to facilitate the movement of the mold carriage on the rails, the carriage is provided with a gear wheel 44 (Figs. 6 and 8) suitably operated which drives through suitable gearing the spindle 45 (Figs. 6 and 8) on which are secured two of the rollers of the carriage.

Fig. 10 is a detail plan of the cup 18. It is of cast iron, strengthened by thick ribs and provided with four arms 20 (Figs. 10 to 12) which serve for raising or lowering it. It has a suitable opening $c^1$ in the center, and on the circumference a series of smaller round holes $c^2$ through which the flexible peripheral inflating devices 55 and 9 pass, connected to the compressed fluid supply tubes, Fig. 7. This figure shows the pattern 5 in section in position for molding. In the cup are arranged removable and interchangeable filling rings $c$ $d$ of suitable shape or height according to the article to be molded. The outer ring $c$ is provided with holes 46 for the passage of the inflaters 9. A circular groove 47 in the ring $c$ is filled in advance with good sand so as to insure that the flange of the molded article shall be of pure and strong cast iron.

The parts 48, 49, $b$, 53, 54, 52, 55 and 9 together constitute what has been called hereinbefore the lower pressure head, because they enable the frame-mold to be closed at the bottom, and a pressure to be exercised in it on the sand to form the mold. As already stated, the whole of these parts, or lower pressure head, is arranged on a piston 57 which moves in a cylinder $a$ Fig. 7 under the action of compressed fluid.

Figure 15:
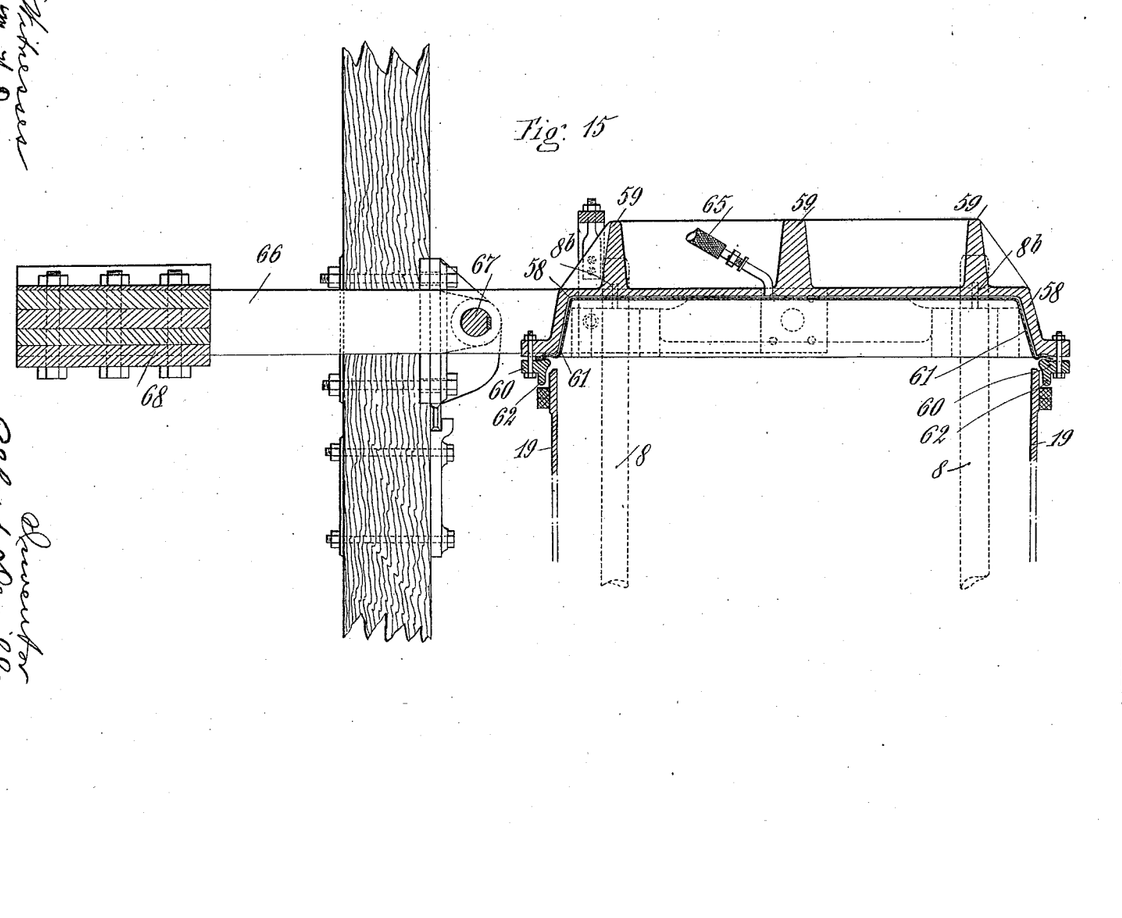
Figs. 15 and 16 show a sectional elevation and plan of the upper pressure head or cover.
Figure 16:
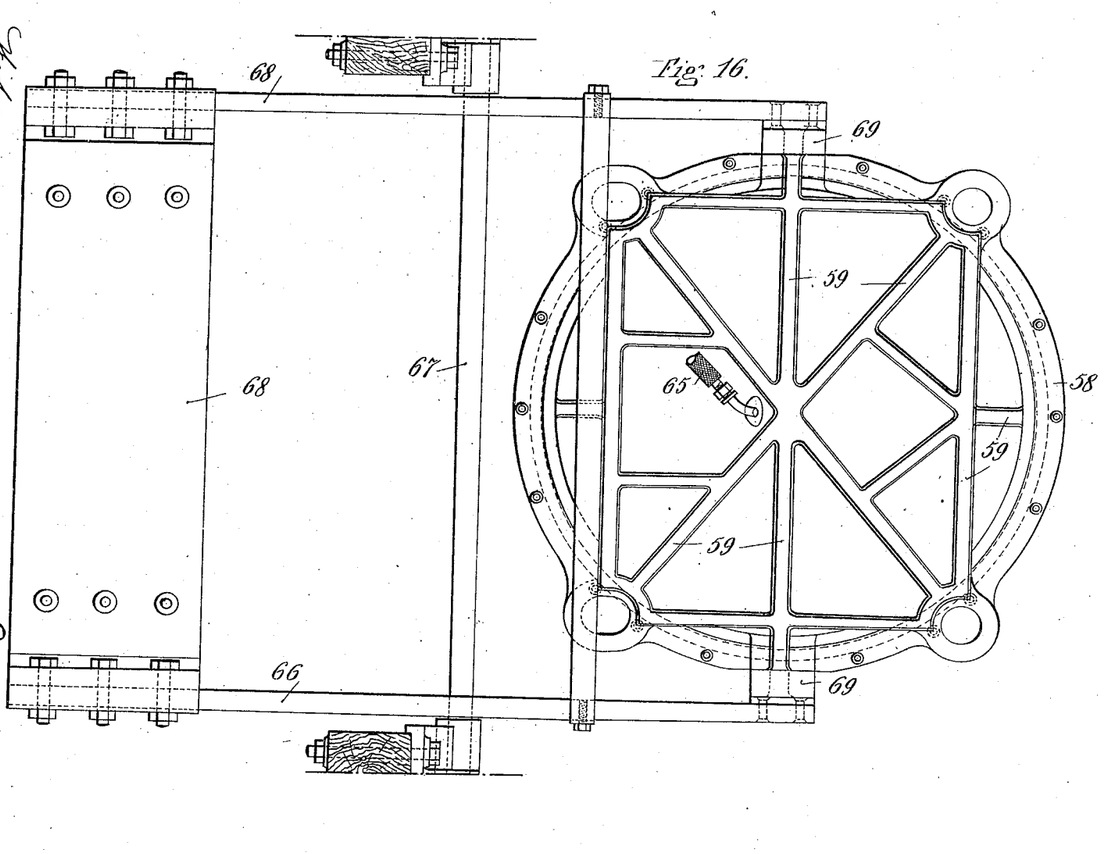

The top pressure head (Figs. 15 and 16) is formed by an inverted cup 58 provided with very strong ribs 59. This cup is intended to receive the excess of sand which is left at the top of the mold before compression, and which, on being compressed, is forced into the frame. The cup 58 is machined on a lathe as regards that part of it which makes contact with the machined ring 60 which is strongly bolted to it, a flexible lining or cover 61, preferably elastic, forming a tight joint between these two parts. The ring 60 is provided with an annular rim 62 engaging around the frame proper 19. In these conditions with the assistance of the small quantity of sand at the joint, the flexible lining 61 can be put under pressure without any fear of its bulging out outside, and without any special precautions being necessary. A flexible hose 65 establishes communication between the interior of the cup 58 and the main conduit for the compressed liquid, the admission of compressed fluid being controlled by a single cock which enables the compressed fluid to be simultaneously admitted: 1. Into the ring of inflating sleeves 9 (Fig. 7). 2. Into the inflating central bag 55 (Fig. 7). 3. Into the inverted cup 58 (Fig. 15) that is to say, between its wall and the inner flexible lining 61. It will be seen that, by proceeding in that manner, the sand inside the pattern, outside and at the top of it, will be submitted to an identical pressure, which is an important point, as the sand mold can be produced in that way without the pattern being deformed. After the sand mold has been prepared, the fluid is discharged through a single outlet cock. In order to facilitate the removal or withdrawal of the inflating apparatus, and in order that they should take up the least possible space during the filling, it is advantageous to place them in communication, during these two operations, with a vessel where a vacuum of about 0.20 centimeters of mercury is maintained.

Two arms 66 (Fig. 15) forming a frame pivoted about a bar 67, enable the upper pressure head to be tilted, and the said part can occupy an approximately vertical position during the filling of the frame (Fig. 2 right hand side). The weight of the upper pressure head is balanced by means of a balance weight 68. If the cup 58 were rigidly secured to the pivoted arms 66, it would strike the upper ends of the columns 8 in an arc of a circle, and the holes for the passage of these columns, made in the lugs of the frame, would be oval and the ring 62 would become wedged on the upper edge of the frame proper 19 before a complete closing took place. In order to avoid the above drawbacks, the cup 58 can be given, by the attendant, a very slight movement on its pivots 69, the geometrical axis of which passes through its center of gravity.

In considering the frame-mold of the construction just described, it will be seen that it is arranged for molding a single part. It is, in fact, thus that the largest parts can be molded, which hitherto were considered as impossible for mechanical molding. For smaller parts it is, however, advantageous to build a frame-mold capable of working with two or even more patterns. Nothing is simpler, a sufficiently large platform is arranged, and frames of suitable size are distributed on its surface. The upper and lower pressure parts are made of suitable size. The filling is effected simultaneously by means of sleeves or funnels, canvas tubes, etc., which convey the sand to the top of each of the patterns.

The following are the advantages of the machine described. 1. Doing away with the "putting into yard", and of the turning over of the molds. 2. Quick filling of the frame-mold in the interior and outside of the hollow pattern. 3. Molds of parts of such shape that it is possible to withdraw the pattern from the sand which has been compressed around them can be obtained with patterns which need not be in several sections in order to enable them to be taken out from the mold. 4. Uniform compression of the sand forming the mold, as well as, and at the same time as, of the outer part and of the inner part of core of the mold, all without deformation of the pattern by means of pockets, bags or flexible surfaces, subjected to the action of a compressed fluid. 5. Removal from and insertion into the mold with perfect precision without any special crane or complicated manipulation. 6. Facility of obtaining more or less large and thick parts according to the degree of pressure of the fluid employed. 7. Mechanical unpacking, removal of the hot sand, its immediate re-use after it has been treated, cooled and moistened in the machine itself. 8. Simple and easy manipulation of the machine without requiring any skilled labor.

What I claim as my invention and desire to secure by Letters Patent is:

1. In a molding machine the combination of a mold, a lower box for the pattern and core, means for holding the parts of the mold in their relative positions, mechanical means for supplying sand to the mold box, means for supplying compressed air to the said mold box, mechanical means for removing the pattern, mechanical means for moving the lower box as described, a receptacle for receiving used sand from the mold, means for supplying water and compressed air to the said sand, a bottomless collecting case for the cooled sand, a conveyer moving under the said case and driving means for the conveyer substantially as set forth.

2. In a molding machine the combination of a mold box comprising a lower box for the pattern and core, means for holding the parts of the mold box in their relative positions, mechanical means for filling the mold box with sand and means for supplying compressed air to the sand in the mold box substantially as set forth.

3. In a molding machine the combination of a pivoted upper pressure chamber, a lower box, perforated arms extending from said box, screwed guide rods passing through perforations in said arms and engaging the latter at their screwed portions, means for simultaneously turning the screwed rods engaging the lower box, means for holding the upper pressure chamber, and means for supplying compressed air to the upper pressure chamber.

4. In a molding machine the combination of a pivoted upper pressure chamber, a lower box, perforated arms extending from said box, screwed guide rods passing through perforations in said arms and engaging the latter at their screwed portions, means for simultaneously turning the screwed rods engaging the lower box, means for reversing the turning motion of the said screws and means for supplying compressed air to the upper pressure chamber.

5. In a molding machine the combination of a mold box comprising an upper pressure chamber and a lower box for the pattern and core, means for holding the parts of the mold box in their relative positions, mechanical means for supplying sand to the mold box, means for simultaneously supplying compressed air to the sand at the exterior of the pattern the interior of said pattern and the upper pressure chamber substantially as set forth.

In testimony whereof I have signed my name to this specification in the presence of two subscribing witnesses.

ALBERT DEVILLE.

Witnesses:
GEORGES FANGÉR,
MAURICE JANET.

---

Copies of this patent may be obtained for five cents each, by addressing the "Commissioner of Patents, Washington, D. C."